(No Model.) 2 Sheets—Sheet 1.
C. ROEHL.
FLOUR MIXING AND SIFTING MACHINE.
No. 389,165. Patented Sept. 4, 1888.
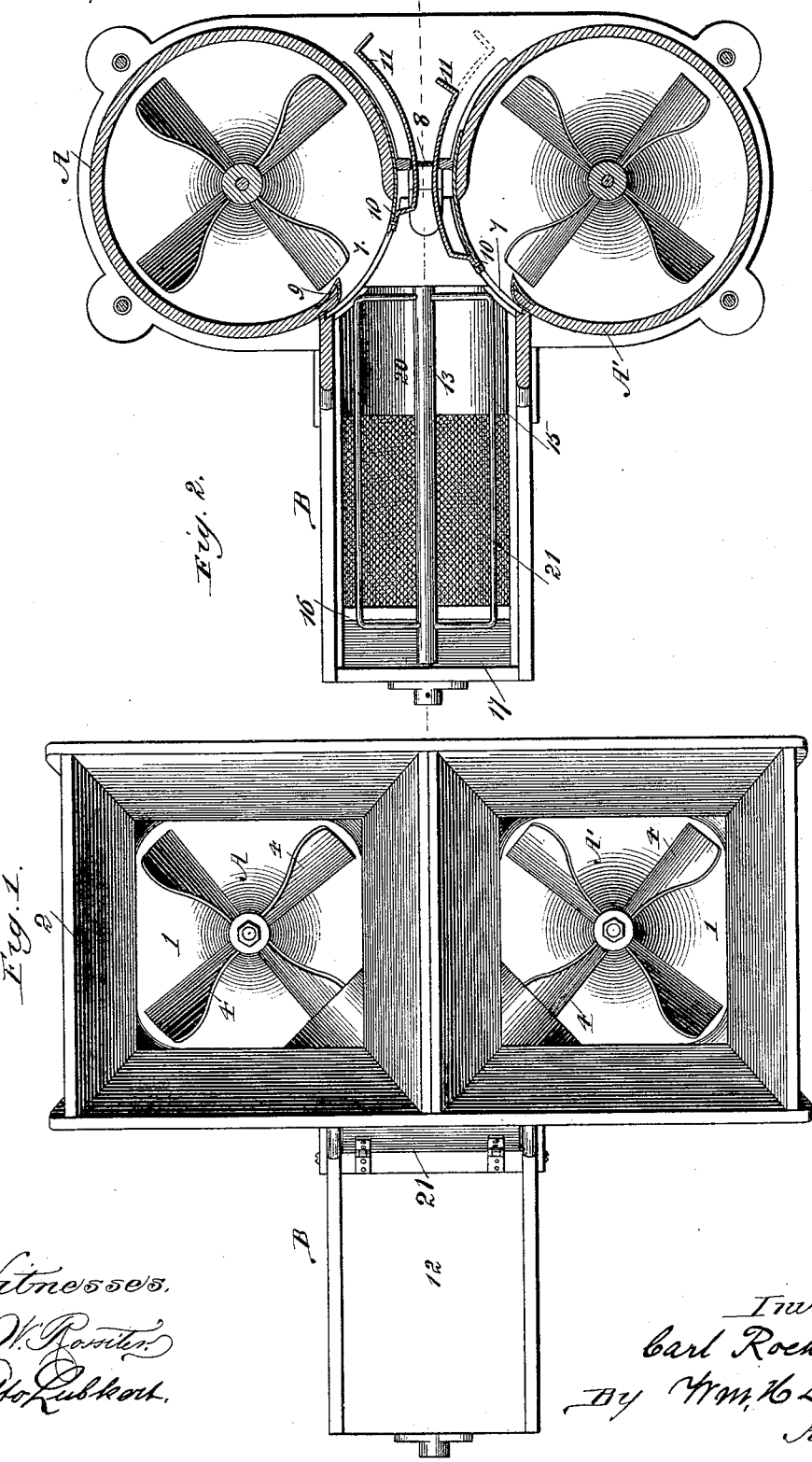

(No Model.) 2 Sheets—Sheet 2.
C. ROEHL.
FLOUR MIXING AND SIFTING MACHINE.
No. 389,165. Patented Sept. 4, 1888.
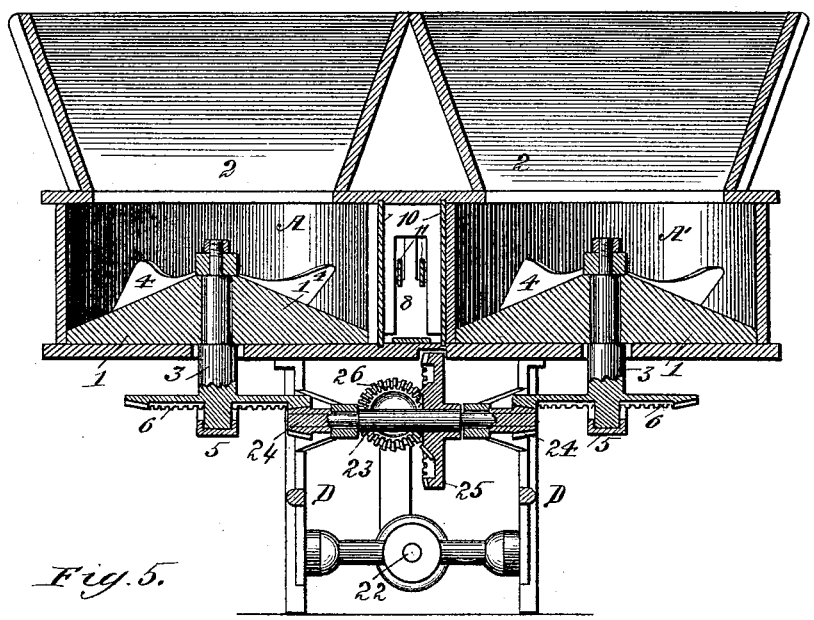
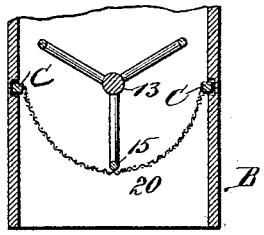
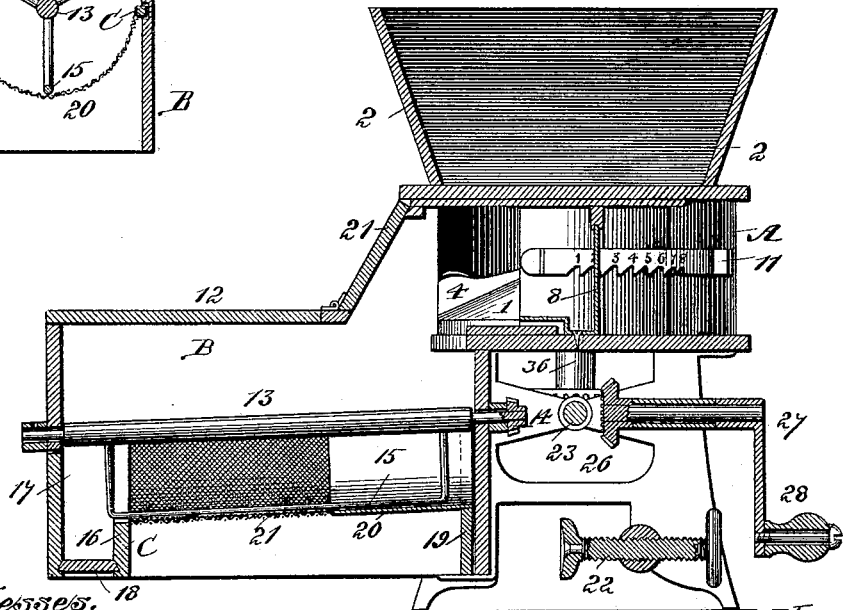
Witnesses.
W. Rossiter.
Otto Lübkert.
Inventor
Carl Roehl.
By Wm. H. Lotz.
Atty.

UNITED STATES PATENT OFFICE.

CARL ROEHL, OF CHICAGO, ILLINOIS, ASSIGNOR OF ONE-HALF TO GEORGE A. MISCH, OF SAME PLACE.

FLOUR MIXING AND SIFTING MACHINE.

SPECIFICATION forming part of Letters Patent No. 389,165, dated September 4, 1888.

Application filed July 19, 1887. Serial No. 244,788. (No model.)

*To all whom it may concern:*

Be it known that I, CARL ROEHL, a citizen of the United States of America, residing at Chicago, in the county of Cook and State of Illinois, have invented certain new and useful Improvements in Flour Mixing and Sifting Machines, of which the following is a specification, reference being had therein to the accompanying drawings.

This invention has for its object to provide a machine arranged to be removably attached to a kneading-trough for mixing and sifting the flour previously to kneading it into dough; and it consists in certain novel and useful devices and combinations of devices hereinafter described and specifically claimed.

In the accompanying drawings, Figure 1 represents a plan view of the machine; Fig. 2, a sectional plan of the same; Fig. 3, a vertical transverse section of the machine through the center line of the feeders; Fig. 4, a longitudinal vertical section on line $x\ x$ in Fig. 2; and Fig. 5 is a cross-section of the sifter-box.

Corresponding letters and figures of reference designate like parts in all the figures.

A and A' denote two cylindrical feed-boxes arranged a short distance apart upon a single platform, each provided with a conical or convex bottom, 1, and with a hopper, 2, to its top.

Through the center of each feed-box A A' is projected a vertical shaft, 3, having mounted to its upper extremity a hub with radial wings 4, corresponding with the angle of the conical bottom 1, and being somewhat on an inclined position. These wings while rotating will scrape the bottom 1 and will push the flour toward the periphery of the box. The bottom end of each shaft 3 is mounted in a suitable step-bearing, 5, suspended under each box A A', and just above this bearing 5 each shaft 3 has mounted a bevel-gear, 6.

In each feed-box A and A' is a side opening, 7, extending from the transverse center line of both boxes forward, and so that the openings of both boxes are facing each other and are both leading into the mixer and sifter box B, placed in front of the feed-boxes and below the same, the feed-outlet chamber being closed in rear by a plate, 8, secured between the boxes A and A'. The forward vertical edge, 9, of each feed-opening 7 is projected a little inward of the box and is lined with a metal plate that is sharp and that will scrape off the flour pushed past by the wings 4 in a continuous sheet, the thickness of which being regulated by a segmental gate, 10, moving in top and bottom guide-grooves and being adjusted and locked by bars 11, pivotally secured to the gates 10 and projected through slots in plate 8 and notched in their bottom edges to engage either notch with the lower edge of the slot by the gravity of bars 11, so as to increase or decrease the width of the feed openings 7.

The inwardly-projecting edge 9 is made to turn in with a sharp curve directly at the point of discharge, while the shells of the cylinders or boxes A A' back of this edge are the same distance from the ends of the blades or wings 4 as that maintained at other points in their circumference. This insures a steady flow of the flour or meal, as there is no long and thin space of the same area as the point of discharge to be kept filled.

The mixer and sifter box B is square, is open in bottom, and has a cover, 12, and the communicating channel from the feeders to the mixer is closed by a trap-door, 21. Longitudinally through this box is placed a shaft, 13, journaled in suitable boxes secured against the end boards of box B, and the rear protruding end of this shaft has mounted a bevel-pinion, 14. Upon shaft 13 are mounted three (more or less) wings, 15, each being a bent bar, the end shanks of which forming the radial arms and the intermediate portion forming sweepstakes.

A frame, C, is made to slide into box B and is divided by a transverse partition, 16, to form a receptacle, 17, with a sliding bottom, 18, and between partition 16 and the rear end board, 19, of this frame C is secured a semi-cylindrical bottom that is concentric with shaft 13, and the rear portion, 20, of which bottom is made of imperforate sheet metal, while the forward portion, 21, is made of wire-gauze. The shaft 13, with wings 15 rotating, will agitate and mix the flour while on the bottom portion, 20, and then by its centrifugal force the flour will be sifted through the wire-gauze, while any foreign matter—like nails, chips of wood, or threads from flour-bags—contained in the flour will pass over the gauze and will collect in receptacle 17.

The feed-boxes A A' and the mixer and sifter box B are both secured to a frame, D, provided with clamp-screw 22, for detachably securing the machine upon one of the end boards of the kneading-trough in the baking-room for mixing and sifting the flour as required.

In suitable bearings forming part of frame D is journaled a shaft, 23, upon the overhanging ends of which are mounted bevel-pinions 24, meshing with the teeth of wheel 6, driving the feeder-wings 4, and intermediate of its journal-boxes the shaft 23 has mounted a bevel-wheel, 25, composing a smaller and larger gear cast in a single piece, the larger gear meshing with pinion 14 for driving mixer-shaft 13 and the smaller gear meshing with bevel-wheel 26, mounted upon shaft 27, journaled in a suitable bearing of frame D and having to its outer end a hand-crank, 28, which with turning will drive the feeder-arms and sweepstakes at proportional speeds. A different kind or quality of flour being dumped into each hopper 2 at the desired proportion, and the gates 10 being adjusted for the required feed, and then the machine being set in motion by turning crank 28, the wings 4, with moving the flour slowly past edge 9, will feed a uniform quantity in a continuous stream from both boxes A A' into tray C, first upon imperforate bottom 20, where, by the sweeping-arms 15, rotated at a high speed, the flour will be thoroughly mixed, and then, moving upon screen 21, it will be sifted into the kneading-trough, while solid matter contained in the flour will be discharged into compartment 17 to be removed from time to time through sliding bottom 18.

Several trays C with different grades of screening may be provided for each machine to insert either one best suited for the kinds of flour to be mixed and sifted.

What I claim is—

1. In a machine for mixing and sifting flour, the cylindrical feed-box provided with an opening, 7, inwardly-projecting edge 9, turned inward upon a short angle at the point of discharge, and rotating scrapers 4, as set forth.

2. In a machine for mixing and sifting flour, the cylindrical feed-boxes A A', each provided with an opening, 7, an inwardly-projecting edge, 9, turned inward upon a short angle at the point of discharge, and adjustable gate 11 and rotating scraper-arms 4, in combination with gearing, substantially as described, for operating the scraper-arms in both boxes in unison, said feed-boxes being mounted side by side to feed into a single receptacle beneath them, all substantially as set forth.

In testimony whereof I affix my signature in presence of two witnesses.

CARL ROEHL.

Witnesses:
WILLIAM H. LOTZ,
OTTO LUBKERT.